(12) United States Patent
Moon et al.

(10) Patent No.: US 8,880,665 B2
(45) Date of Patent: Nov. 4, 2014

(54) NONSTOP SERVICE SYSTEM USING VOTING, AND INFORMATION UPDATING AND PROVIDING METHOD IN THE SAME

(75) Inventors: Jang Won Moon, Seoul (KR); Jung Hun Moon, Seoul (KR); Chan Seok Chun, Seoul (KR)

(73) Assignee: NHN Corporation, Kyunggi-Do (KR)

( * ) Notice: Subject to any disclaimer, the term of this patent is extended or adjusted under 35 U.S.C. 154(b) by 1583 days.

(21) Appl. No.: 11/509,973

(22) Filed: Aug. 24, 2006

(65) Prior Publication Data

US 2006/0282435 A1    Dec. 14, 2006

Related U.S. Application Data

(63) Continuation of application No. PCT/KR2005/000534, filed on Feb. 25, 2005.

(30) Foreign Application Priority Data

Feb. 25, 2004  (KR) ........................ 10-2004-0012640

(51) Int. Cl.
*G06F 7/00* (2006.01)
*G06F 11/00* (2006.01)
(Continued)

(52) U.S. Cl.
CPC ........ *H04L 67/1002* (2013.01); *G06F 11/1425* (2013.01); *G06F 11/187* (2013.01); *G06F*
(Continued)

(58) Field of Classification Search
CPC . H04L 69/40; H04L 67/1095; H04L 67/1002; H04L 67/1034; H04L 67/02; H04L 41/0846; H04L 41/12; H04L 67/34; H04L 67/306; H04L 41/0672; G06F 11/1425; G06F 11/187; G06F 11/2094; G06F 11/2048; G06F 11/1662; G06F 11/201; G06F 11/202; G06F 11/181
USPC ........... 709/223, 217, 224; 370/229; 707/637; 714/4.11
See application file for complete search history.

(56) References Cited

U.S. PATENT DOCUMENTS

| 5,317,752 A | 5/1994 | Jewett et al. |
| 5,748,882 A * | 5/1998 | Huang ............................ 714/47 |

(Continued)

FOREIGN PATENT DOCUMENTS

| KR | 10-2002-0096027 | 12/2002 |
| KR | 10-2003-0069635 | 8/2003 |

*Primary Examiner* — Daniel C Murray
(74) *Attorney, Agent, or Firm* — Harness, Dickey & Pierce, P.L.C.

(57) ABSTRACT

A nonstop service system using voting and a method for updating and providing information in the nonstop service system. The nonstop service system includes a plurality of groups of nodes for storing and managing information on the basis of identifiers for distinguishing clients, each group including a plurality of nodes each of which is capable of storing and managing information independently. The nonstop service system further includes a control dispatcher server, which is located between the group of nodes and the clients and manages state information and connection information of the nodes belonging to the plurality of groups of nodes. The control dispatcher server selects a group of nodes corresponding to a client according to an information update and provision request from the client, transmits the information update and provision request to the nodes belonging to the selected group of nodes, and, when information is provided from the nodes, provides information which is selected from the provided information using voting based on a specific criterion such as a currency criterion to the client. According to the present invention, it is possible to invest in constructing an initial service system based on the amount of service use, and it is possible to construct a service system with low costs and high efficiency. Further, a nonstop service system can be efficiently constructed without requiring additional equipment.

20 Claims, 5 Drawing Sheets

(51) Int. Cl.
*G06F 15/16* (2006.01)
*G06F 15/173* (2006.01)
*H04L 12/26* (2006.01)
*H04L 29/08* (2006.01)
*G06F 11/14* (2006.01)
*G06F 11/18* (2006.01)
*H04L 29/14* (2006.01)
G06F 11/20 (2006.01)
G06F 11/16 (2006.01)
H04L 12/24 (2006.01)

(52) U.S. Cl.
CPC    11/2094 (2013.01); *G06F 11/2048* (2013.01); *G06F 11/1662* (2013.01); *G06F 11/201* (2013.01); *G06F 11/202* (2013.01); *G06F 11/181* (2013.01); *H04L 69/40* (2013.01); *H04L 67/1095* (2013.01); *H04L 67/1034* (2013.01); *H04L 67/306* (2013.01); *H04L 41/0846* (2013.01); *H04L 41/12* (2013.01)
USPC .......... 709/223; 370/229; 707/637; 709/217; 709/224; 714/4.11

(56) References Cited

U.S. PATENT DOCUMENTS

| | | | |
|---|---|---|---|
| 5,815,649 A * | 9/1998 | Utter et al. | 714/6 |
| 5,822,518 A * | 10/1998 | Ooki et al. | 726/6 |
| 5,878,215 A * | 3/1999 | Kling et al. | 709/207 |
| 5,909,540 A | 6/1999 | Carter et al. | |
| 5,956,489 A * | 9/1999 | San Andres et al. | 709/221 |
| 6,052,718 A * | 4/2000 | Gifford | 709/219 |
| 6,092,178 A * | 7/2000 | Jindal et al. | 712/27 |
| 6,154,782 A * | 11/2000 | Kawaguchi et al. | 709/239 |
| 6,178,441 B1 * | 1/2001 | Elnozahy | 709/203 |
| 6,324,580 B1 * | 11/2001 | Jindal et al. | 709/228 |
| 6,327,622 B1 * | 12/2001 | Jindal et al. | 709/228 |
| 6,351,821 B1 * | 2/2002 | Voth | 713/600 |
| 6,421,725 B1 * | 7/2002 | Vermilyea et al. | 709/224 |
| 6,493,826 B1 | 12/2002 | Schofield et al. | |
| 6,671,821 B1 | 12/2003 | Castro et al. | |
| 6,748,381 B1 * | 6/2004 | Chao et al. | 1/1 |
| 7,062,648 B2 * | 6/2006 | Moulton et al. | 713/153 |
| 7,130,905 B2 * | 10/2006 | Dinker et al. | 709/225 |
| 7,149,771 B1 * | 12/2006 | Gifford | 709/203 |
| 7,181,518 B1 * | 2/2007 | Matsumoto et al. | 709/224 |
| 7,428,542 B1 * | 9/2008 | Fink et al. | 707/100 |
| 7,444,337 B2 * | 10/2008 | Zhou et al. | 707/10 |
| 7,523,163 B2 * | 4/2009 | Zhu et al. | 709/204 |
| 7,631,034 B1 * | 12/2009 | Haustein et al. | 709/201 |
| 7,747,740 B2 * | 6/2010 | Doshi et al. | 709/224 |
| 7,756,830 B1 * | 7/2010 | Chao et al. | 707/638 |
| 7,768,917 B2 * | 8/2010 | Nakayama et al. | 370/230.1 |
| 7,885,928 B2 * | 2/2011 | Harrington et al. | 707/637 |
| 7,987,449 B1 * | 7/2011 | Marolia et al. | 717/120 |
| 8,005,927 B2 * | 8/2011 | Apfel et al. | 709/219 |
| 8,214,464 B2 * | 7/2012 | Apfel et al. | 709/219 |
| 8,255,893 B2 * | 8/2012 | Savva | 717/168 |
| 8,281,007 B2 * | 10/2012 | Goto et al. | 709/225 |
| 8,473,775 B1 * | 6/2013 | Helmick et al. | 714/4.11 |
| 8,533,322 B2 * | 9/2013 | Chamberlain et al. | 709/224 |
| 8,595,378 B1 * | 11/2013 | Cohn et al. | 709/238 |
| 8,631,269 B2 * | 1/2014 | Vinayak et al. | 714/4.11 |
| 2001/0039548 A1 * | 11/2001 | Shinkai et al. | 707/201 |
| 2001/0042221 A1 * | 11/2001 | Moulton et al. | 714/5 |
| 2002/0059170 A1 * | 5/2002 | Vange | 707/1 |
| 2002/0099837 A1 * | 7/2002 | Oe et al. | 709/229 |
| 2002/0112008 A1 | 8/2002 | Christenson | |
| 2003/0093565 A1 * | 5/2003 | Berger et al. | 709/246 |
| 2003/0110210 A1 * | 6/2003 | Nolan et al. | 709/203 |
| 2004/0049532 A1 * | 3/2004 | Oka et al. | 709/202 |
| 2004/0083278 A1 * | 4/2004 | Becherer | 709/221 |
| 2005/0022045 A1 * | 1/2005 | Fenart et al. | 714/4 |
| 2005/0138461 A1 * | 6/2005 | Allen et al. | 714/4 |
| 2005/0203962 A1 * | 9/2005 | Zhou et al. | 707/200 |
| 2006/0031317 A1 * | 2/2006 | Lin et al. | 709/206 |
| 2006/0161802 A1 * | 7/2006 | Wang et al. | 714/4 |
| 2007/0043859 A1 * | 2/2007 | Ruul | 709/224 |
| 2008/0140719 A1 * | 6/2008 | Chaney et al. | 707/104.1 |
| 2009/0070412 A1 * | 3/2009 | D'Angelo et al. | 709/203 |
| 2009/0070490 A1 * | 3/2009 | Dozier et al. | 709/248 |
| 2009/0100174 A1 * | 4/2009 | Annareddy et al. | 709/224 |
| 2009/0113052 A1 * | 4/2009 | Doshi et al. | 709/225 |
| 2009/0228732 A1 * | 9/2009 | Budde et al. | 713/400 |
| 2010/0023512 A1 * | 1/2010 | Ramakrishnan et al. | 707/5 |
| 2010/0205152 A1 * | 8/2010 | Ansari et al. | 707/654 |
| 2010/0250749 A1 * | 9/2010 | Kadota | 709/226 |
| 2010/0274893 A1 * | 10/2010 | Abdelal et al. | 709/224 |
| 2011/0093564 A1 * | 4/2011 | Li et al. | 709/217 |
| 2011/0289351 A1 * | 11/2011 | Rashmi et al. | 714/6.32 |
| 2011/0320379 A1 * | 12/2011 | Roslak et al. | 705/345 |
| 2012/0023263 A1 * | 1/2012 | Dozier et al. | 709/248 |
| 2012/0278875 A1 * | 11/2012 | Kissinger et al. | 726/7 |
| 2013/0024515 A1 * | 1/2013 | Parker | 709/204 |
| 2013/0290960 A1 * | 10/2013 | Astete et al. | 718/1 |

\* cited by examiner

NONSTOP SERVICE SYSTEM USING VOTING, AND INFORMATION UPDATING AND PROVIDING METHOD IN THE SAME

CROSS-REFERENCE TO RELATED APPLICATIONS

This application is a continuation of, and incorporates by reference in its entirety, International Application No. PCT/KR2005/000534, filed Feb. 25, 2005.

BACKGROUND OF THE INVENTION

1. Field of the Invention

This invention relates to a service system for support of extensive services, and more particularly to a nonstop service system, which is capable of providing fault tolerant and scalable information using voting when volatile information such as presence information is provided, and an information updating and providing method in the same system.

2. Description of the Related Art

Existing typical service server systems have been mainly employed methods of processing services using extended central processing units, memories, and external storages for support of extensive services or using various server systems distributed through a simple software process.

However, these methods have a problem in that the services should be interrupted when processors and memories of the existing service server systems are replaced by processors having higher processing capabilities and memories having higher storage capabilities, and extensive costs are required for purchase of high-performance systems.

On the other hand, with the improvement of networking technologies such as the Internet, techniques of using networks for processing of mass information have been developed. For example, Korean Patent Application Publication No. 2002-96027, which is owned by Compine Co., Ltd, entitled "Grid file system for storing and servicing files using storages of personal computers and network resources distributed all over the world," discloses a technique in which a mass binary file is divided into a plurality of smaller files, copies of the plurality of smaller files are prepared and dispersedly disposed in unused storage spaces of personal computers distributed all over the world, and, when specific data are demanded, the dispersedly disposed files are sequentially downloaded and integrated into one file.

In addition, Korean Patent Application Publication No. 2003-69635, which is owned by Ewi-Bum Lee, entitled "Intranet integration management system and method based on peer-to-peer system," discloses a technique allowing efficient management of and access to information possessed by client systems connected to one another via an intranet by directly connecting the client systems to one another, which access a server system and possess search data, using a peer-to-peer system.

However, since the above-mentioned techniques merely disperse, copy, or store the same file, there is a problem in that relevant information cannot be provided if a failure of a system storing a relevant file occurs.

Among SIP (Session Initiation Protocol) systems which are increasingly being used in communication networks, particularly in the case of a VIPS (Volatile Information Providing System), which is a system for providing volatile information to be frequently updated, such as a SIP registrar storing registration information of users, an HLR (Home Location Register) registering home location information of subscribers in mobile communication or the like, or a presence server storing presence information indicating state of users and the like, there is a need to provide continuous services in real time without interruption of services due to external failure environments and to overcome a system limit due to the rapidly increasing number of users, with low costs.

SUMMARY OF THE INVENTION

One embodiment includes a nonstop service system for support of mass services for storing the same information in a group of nodes. Each group includes a plurality of nodes and, when relevant information is requested to be provided, the group selects and providing the most appropriate information using voting among information provided from the plurality of nodes included in the group of nodes. The embodiment also includes a method for updating and providing the information in the nonstop service system.

In one embodiment, a nonstop service system includes a plurality of groups of nodes for storing and managing information on the basis of identifiers for distinguishing clients. Each group includes a plurality of nodes each of which is capable of storing and managing information independently. A control dispatcher server is also provided for managing state information and connection information of nodes belonging to the plurality of groups of nodes, selecting a group of nodes corresponding to a client according to an information update and provision request from the client, transmitting the information update and provision request to the nodes belonging to the group of nodes, and when information is provided from the nodes, providing information which is selected from the provided information based on a specific criterion to the client.

According to another embodiment, a method for updating information stored in nodes in a nonstop service system employing a plurality of groups of nodes for storing and managing information on the basis of identifiers for distinguishing clients is provided. Each group includes a plurality of nodes each of which is capable of storing and managing information independently. The method includes selecting a group of nodes corresponding to a client from among the plurality of groups of nodes according to an information update request from the client, transmitting the information update request from the client to the nodes belonging to the selected group of nodes, and receiving a result of the requested information update from the nodes and transmitting the received result to the client.

According to still another embodiment, a method for providing information stored in nodes in a nonstop service system employing a plurality of groups of nodes for storing and managing information on the basis of identifiers for distinguishing clients is provided, wherein each group includes a plurality of nodes each of which is capable of storing and managing information independently. The method includes selecting a group of nodes corresponding to a client from among the plurality of groups of nodes according to an information provision request from the client, transmitting the information provision request from the client to the nodes belonging to the selected group of nodes, receiving the requested information from the nodes, and providing information, which is selected according to a specific criterion, of the received information.

DETAILED DESCRIPTION OF THE PREFERRED EMBODIMENTS

Hereinafter, a service system for support of extensive services in accordance with exemplary embodiments will be described in detail with reference to the accompanying drawings.

Figure 1:
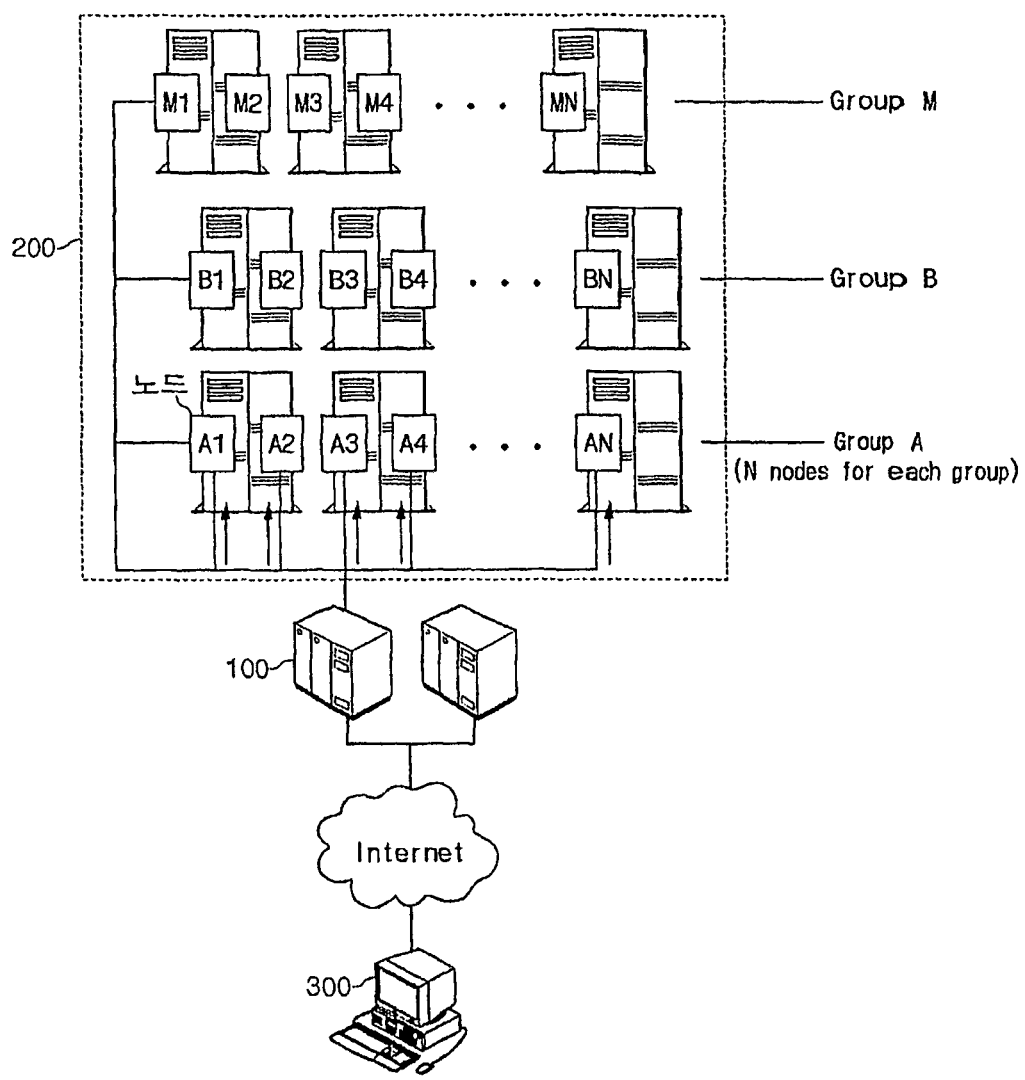
FIG. 1 is a block diagram of a nonstop service system using voting in accordance with one embodiment.

FIG. 1 is a block diagram of a nonstop service system using voting in accordance with one embodiment.

As shown in FIG. 1, a nonstop service system using voting in accordance with one embodiment includes a control dispatcher server (CDS) 100 and a node storing unit 200.

The node storing unit 200 stores information independently, and is composed of a plurality of groups of nodes A1 to AN, B1 to BN, and M1 to MN, which are coupled to one another by a network. Each of the plurality of groups of nodes is composed of a plurality of nodes. For example, group A is composed of nodes A1 to AN, group B is composed of nodes B1 to BN, and group C is composed of nodes M1 to MN (where N and M are natural numbers). In this case, each node A1 to AN, B1 to BN, and M1 to MN may be a single physical server or one or more servers may exist distinguishably in a single physical server. Moreover, a group of same nodes may exist in a single physical server or more servers. That is, each node A1 to AN, B1 to BN, and M1 to MN is a logical process unit. It is assumed in FIG. 1 that M groups of nodes exist, and each group of nodes is composed of N nodes.

On the other hand, the groups of nodes are sets of nodes grouped according to a specific criterion, for example, an identifier such as ID or a telephone number of a client 300. In consideration of the total number of nodes with the specific criterion, nodes are distributed in each group of nodes or are allotted to each group of nodes using a hash algorithm.

Accordingly, the control dispatcher server 100 executes an algorithm for selecting a relevant group of nodes when information is stored and provided by a request from the client 300 according to the specific criterion by which the groups of nodes are classified.

The control dispatcher server 100 stores and manages state information and connection information of each node A1 to AN, B1 to BN, and M1 to MN existing in the node storing unit 200, receives the request from the client 300, selects a group of nodes based on the received request, and requests a relevant group of nodes to operate. Particularly, the control dispatcher server 100 requests a group of nodes managing relevant information to provide the relevant information according to a request for information from the client 300, votes the most appropriate information among information provided from nodes belonging to the group of nodes, and provides the voted information to the client 300. In this case, a currency criterion or the like according to which information updated latest is voted using obtained time information may be utilized as a criterion according to which the control dispatcher server 100 votes the most appropriate information among the information provided from the group of nodes. Particularly, the currency criterion may be most efficient for positional information and the like.

On the other hand, the control dispatcher server 100 manages information as shown in Table 1 below.

TABLE 1

| Division | Description |
| --- | --- |
| Node ID | Node identifier to manage |
| Group of Node | Group to which nodes belong |
| Node Address | Accessible IP and port information of node |
| Node Connection Information | Connection information required when connection with node is maintained |
| Node Management Information and Other Information | Management information such as load and response speed derived from basic statistical information such as the total number of node information sets and the number of movements for each node |

On the other hand, each node A1 to AN, B1 to BN, and M1 to MN has information management material of a general information system. The nodes A1 to AN, B1 to BN, and M1 to MN are synchronized in time through NTP (Network Time Protocol) in order to manage the currency of information such that the currency criterion can be a criterion by which the most appropriate information is voted.

Hereinafter, a control method of the nonstop service system using the voting in accordance with one embodiment will be described in detail with reference to the accompanying drawings.

Figure 2:
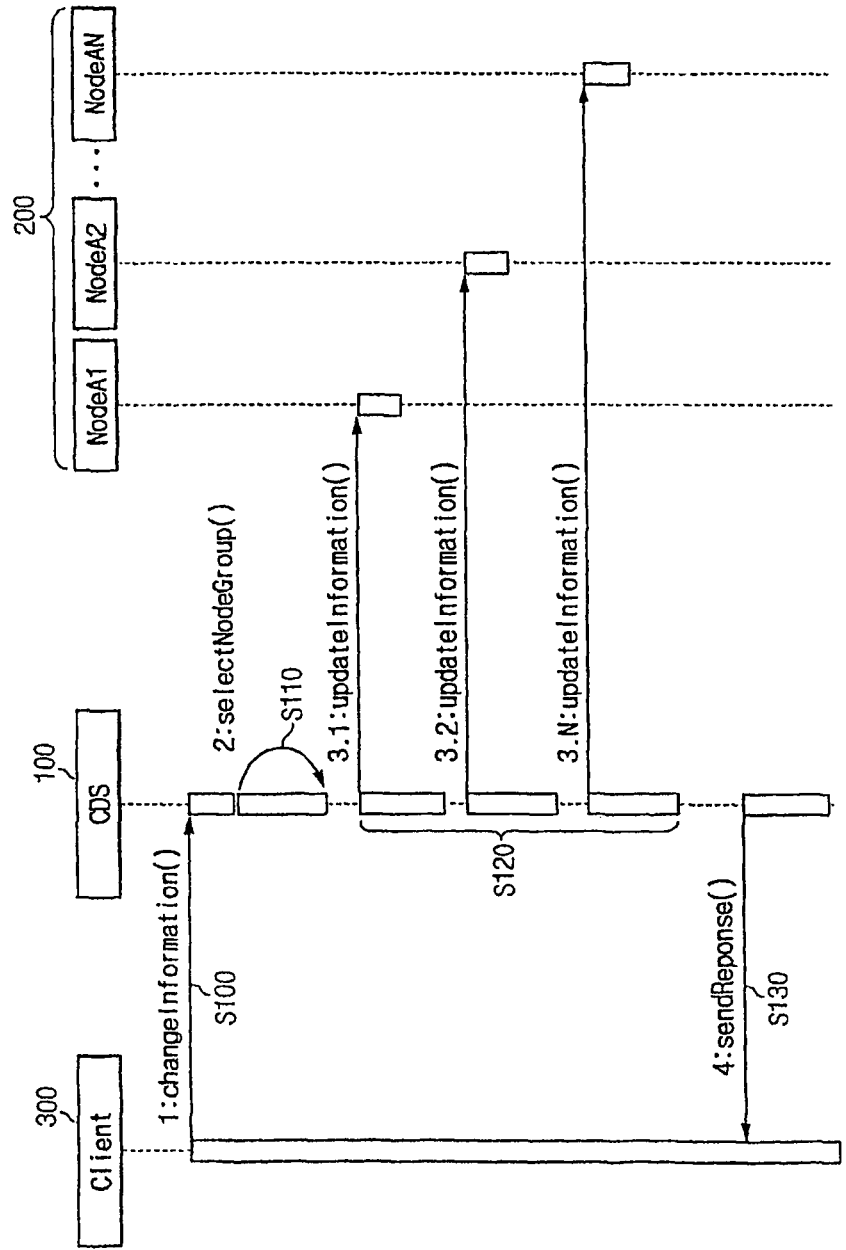
FIG. 2 is a flowchart illustrating an information updating method in the nonstop service system using voting in accordance with one embodiment.

First, a method for updating information of the client 300 will be described with reference to FIG. 2.

When state information of the client 300 is changed, the client 300 transmits the changed state information to the control dispatcher server (CDS) 100 through a message of changeInformation ( ) (S100).

The control dispatcher server 100 selects a group of nodes to perform a change of information requested from the client 300 through a node group selection algorithm to generate a corresponding list of groups of nodes (selectNodeGroup( ), S110), and requests nodes belonging to the list of groups of nodes to update relevant information through a message of updateInformation( ) (S120). For example, when the control dispatcher server 100 votes ("selects") a group of nodes A as the group of nodes to perform the information change requested from the client 300, the nodes A1 to AN belonging to the group of nodes A are requested to update the relevant information. In this case, although information update request messages to the nodes A1 to AN are shown to be transmitted from the control dispatcher server 100 in FIG. 2, these messages may be simultaneously transmitted as broadcast messages to all nodes A1 to AN belonging to the group of nodes A.

Thereafter, the control dispatcher server 100 receives a response to the information update from the nodes requested to update the information, and then informs the client 300 of a result of the information update through a message of sendResponse( ) (S130). Then, the process of the information update is terminated.

Next, a method for providing the information requested by the client 300 will be described with reference to FIG. 3.

The client 300 requests the control dispatcher server 100 to provide the information using a message of requestInformation( ) in order to receive required information (S200).

The control dispatcher server 100 votes ("selects") a group of nodes to provide the information requested by the client 300 using the node group selection algorithm, selects relevant nodes from the selected group of nodes (selectNodeGroup( ), S210), and requests the selected relevant nodes to provide the requested information through a message of fetchInformation( ) (S220). For example, if the group of nodes to provide the information requested by the client 300 is voted as the group of nodes A by the control dispatcher server 100, the nodes A1 to AN belonging to the group of nodes A are requested to provide the information. Like in the above description, in this case, although information update request messages to the nodes A1 to AN are shown to be transmitted from the control dispatcher server 100 in FIG. 3, these messages may be simultaneously transmitted as broadcast messages to all nodes A1 to AN belonging to the group of nodes A.

Next, the nodes A1 to AN requested to provide the information by the control dispatcher server 100 search their databases to find the requested information and provide the found information to the control dispatcher server 100 through a message of sendInformation( ), thereby participating in an information selection vote (S230).

On the other hand, when the control dispatcher server 100 receives the requested information from the nodes, it performs voting for selecting appropriate information from the received information based on a specific criterion such as the currency criterion (selectBestInformation( ) S240), and sends the selected information to the client through a message of sendResponse( ). Then, the process of providing the information is terminated (S250).

Figure 3:
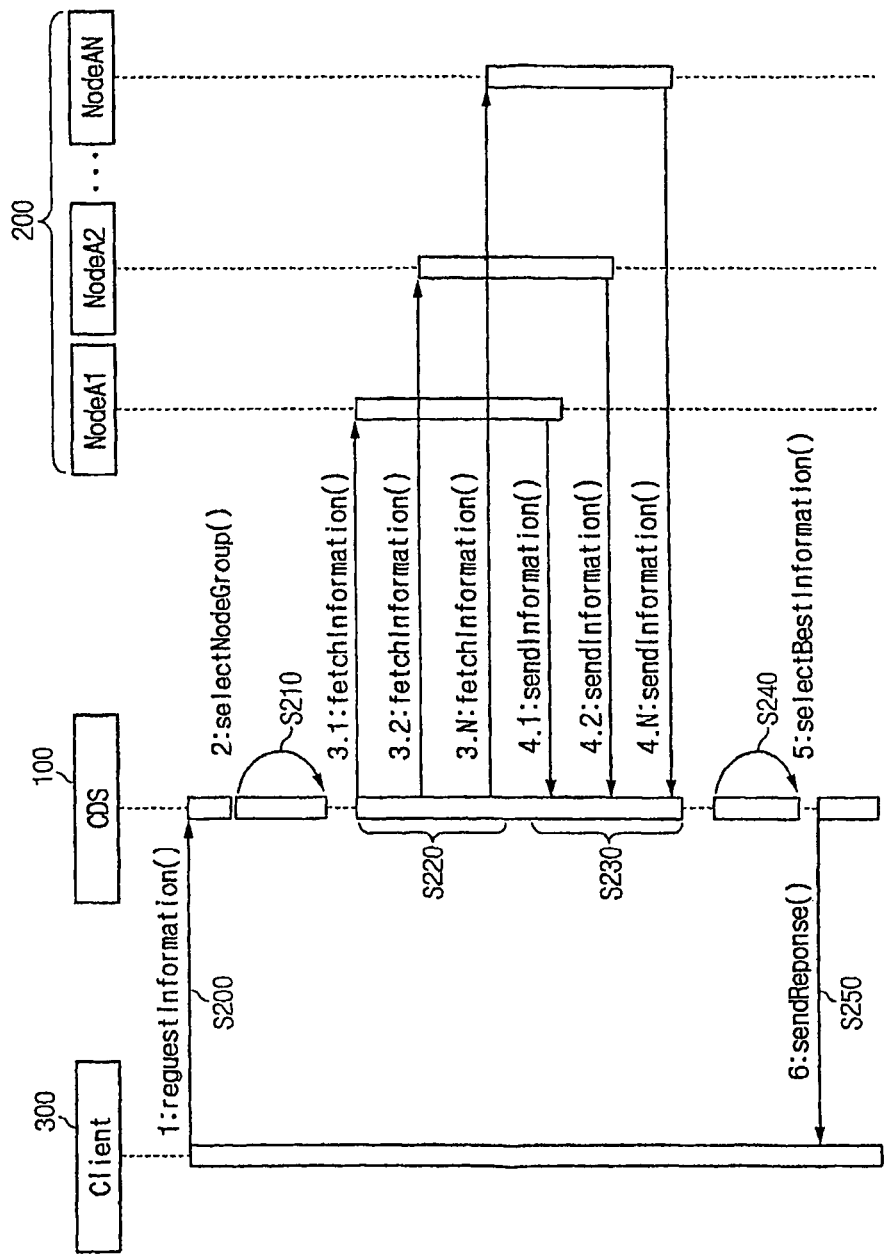
FIG. 3 is a flowchart illustrating an information providing method in the nonstop service system using voting in accordance with one embodiment.

The method of FIG. 3 for providing the information requested by the client is applied once when all of the nodes requested to provide the information perform a normal operation. Accordingly, if there is any node that does not provide the requested information due to any failure making the normal operation difficult to be performed, the method of FIG. 3 may be somewhat differently operated.

Next, a method for providing the information requested by the client 300 when a failure in a certain node occurs will be described with reference to FIG. 4.

First, the client 300 requests the control dispatcher server 100 to provide the information using a message of requestInformation( ) in order to receive required information (S300).

Next, the control dispatcher server 100 votes ("selects") a group of nodes to provide the information requested by the client 300 using the node group selection algorithm, selects relevant nodes from the selected group of nodes (selectNodeGroup( ), S310), and requests the selected relevant nodes to provide the requested information through a message of fetchInformation( ) (S320). For example, if the group of nodes to provide the information requested by the client 300 is voted as the group of nodes A by the control dispatcher server 100, the nodes A1 to AN belonging to the group of nodes A are requested to provide the information. Like in the above description, in this case, although information update request messages to the nodes A1 to AN are shown to be transmitted from the control dispatcher server 100 in FIG. 4, these messages may be simultaneously transmitted as broadcast messages to all nodes A1 to AN belonging to the group of nodes A.

Next, the nodes A1 to AN requested to provide the information by the control dispatcher server 100 search their databases to find the requested information and provide the found information to the control dispatcher server 100 through a message of sendInformation( ), thereby participating in an information selection vote (S330). In this case, if there are one or more nodes which do not perform a normal information providing operation due to a failure, of the nodes requested to provide the information by the control dispatcher server 100, a case may occur where the control dispatcher server 100 fails to be connected to a relevant node requested to provide the information, or transmission failure of the message of fetchInformation( ) requesting to provide the information occurs during transmission, or, although transmission of a requested message to a relevant node is completed, the relevant node generates no response for a certain period of time, for example, 2 or 3 seconds without providing requested information. In this case, since the control dispatcher server 100 cannot process the information providing operation until the node in which the failure occurs is restored, the node is specified as a failure management object to be managed. After the node is restored, the control dispatcher server 100 excludes the restored node from the failure management object and causes the restored node to perform a normal information providing operation. Accordingly, the control dispatcher server 100 may not request provision of the information until one or more nodes in which the failure occurs are restored. Moreover, the control dispatcher server 100 may exclude one or more node in which the failure occurs from the group of nodes providing the information.

Figure 4:
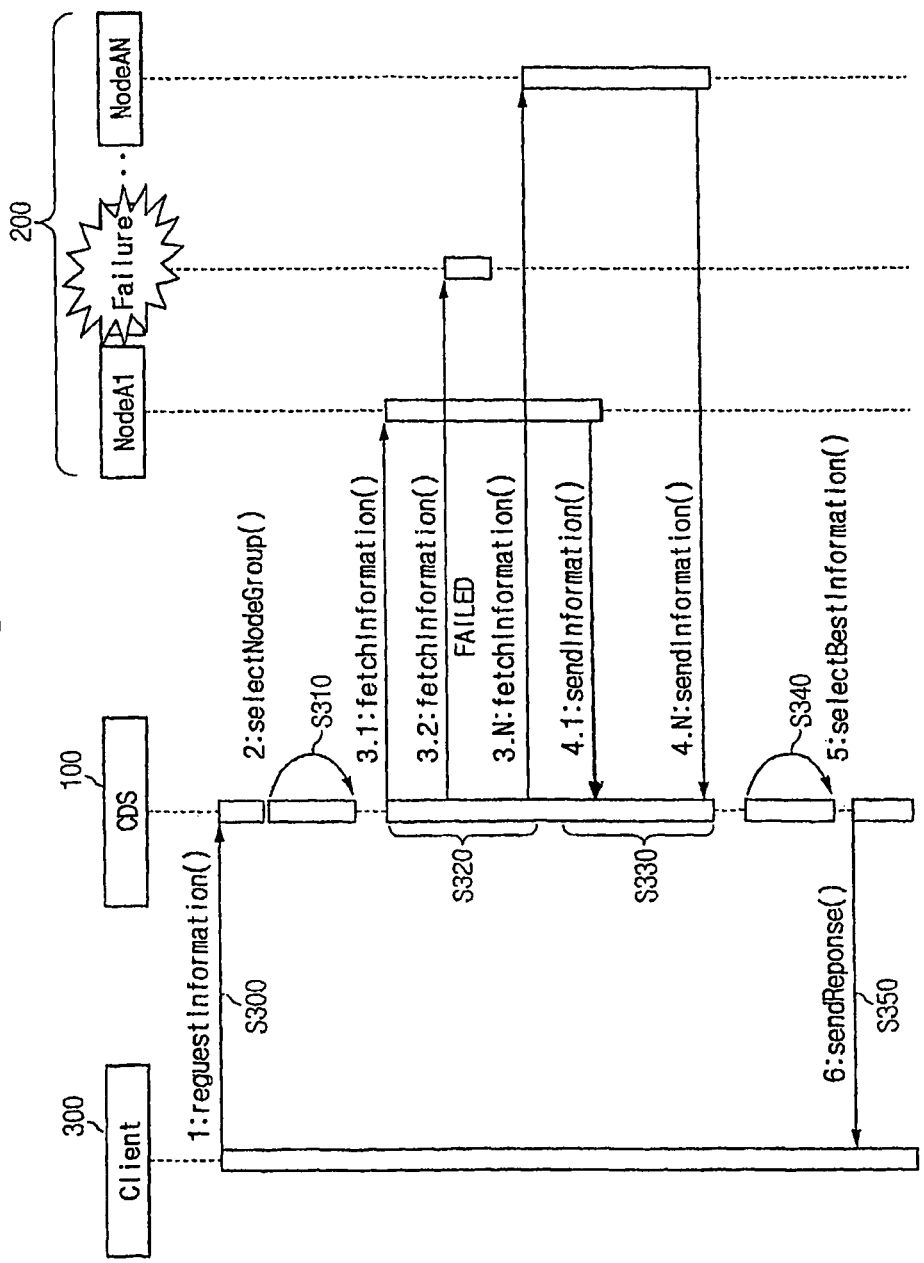
FIG. 4 is a flowchart illustrating an information updating method when a failure of a certain node occurs in the nonstop service system using voting in accordance with one embodiment.

FIG. 4 shows an example where a failure occurs in a node A2 NodeA2. As shown in FIG. 4, although the control dispatcher server 100 transmits the message of fetchInformation( ), which requests provision of the information, to the node A2 (S320), it cannot receive the requested information from the node A2 in the next step (S330) due to the failure in the node A2. Accordingly, the control dispatcher server 100 may not request the node A2 to provide the information in the next information providing request.

On the other hand, when the requested information is received from remaining nodes except the one or more nodes which do not provide the information due to the failure, the control dispatcher server 100 performs voting for selecting appropriate information from the received information based on a specific criterion such as the currency criterion (selectBestInformation( ), S340) and sends the selected information to the client through a message of sendResponse( ). Then, the process of providing the information is terminated (S350).

In such a manner, in this embodiment, as long as no failure occurs in every node belonging to the group of node providing the information, the information requested by the client 300 can be appropriately selected and provided according to the specific criterion without stopping the information providing operation.

Next, a method for providing the information requested by the client 300 when the restored node or an additional node is registered and after the registration will be described with reference to FIG. 5.

Figure 5:
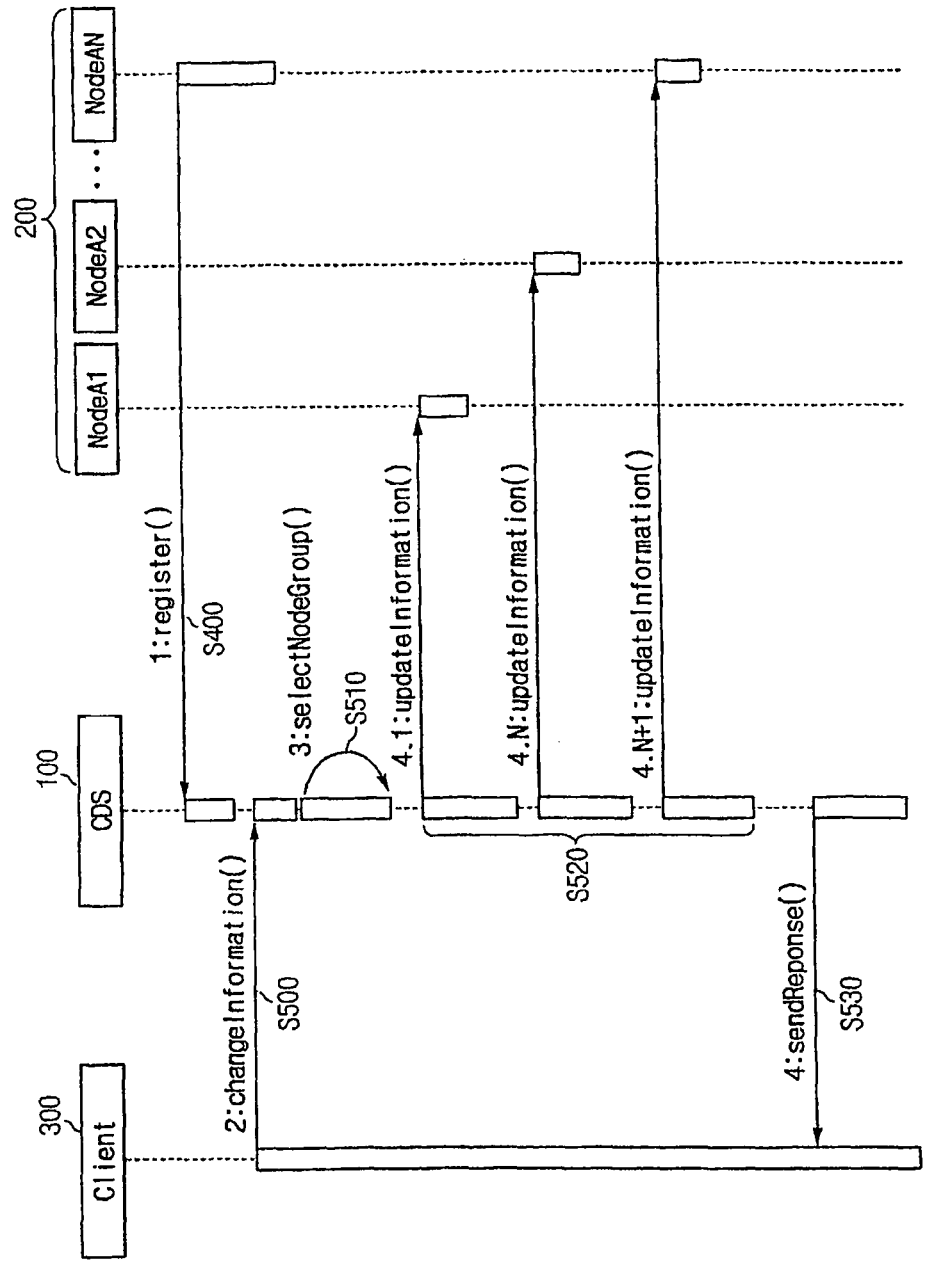
FIG. 5 is a flowchart illustrating an information updating method when a restored node or an additional node is registered and after the registration in the nonstop service system using voting in accordance with one embodiment.

First, if the node removed from registration in the group of nodes to provide the information to the control dispatcher server 100 as a failure in the node occurs is restored and registered in the group of nodes by the control dispatcher server 100, or if an additional node for extension of the node storing unit 200 is registered in the group of nodes, the restored node or the additional node, for example, a node AN+1 NodeAN+1 in FIG. 5, transmits a message of register( ), which requests its registration in the group of nodes and notifies its participation in voting, to the control dispatcher server 100 (S400). Accordingly, the control dispatcher server 100 additionally registers the node transmitted the registration request message in the group of nodes and manages the registered node in such a manner that the registered node operates well as a node for providing the information.

Thereafter, the control dispatcher server 100 requests the restored node or the additional node to perform the information updating operation, the information providing operation, or the like.

For example, in the information updating operation, when a message of changeInformation( ) for update of the state information is transmitted from the client 300 (S500), the control dispatcher server 100 selects a group of nodes to perform the information update requested by the client 300 using the node group selection algorithm (selectNodeGroup( ), S510), and requests nodes belonging to the selected group of nodes to update the information through a message of updateInformation( ) (S520). At this time, the restored node or the additional node is requested to update the information. For example, if the group of nodes to perform the information update requested by the client 300 is selected as the group of nodes A by the control dispatcher server 100, the nodes A1 to AN+1 belonging to the group of nodes A are requested to update the information. Where, AN+1 denotes the additional node.

Thereafter, the control dispatcher server 100 receives a response to the information update from the nodes requested to update the information and then informs the client 300 of a result of the information update through a message of sendResponse( ) (S530). Then, the process of the information update is terminated.

As described above, the normal information updating operation, the normal information providing operation, the information providing operation when a failure occurs in a node, and the information updating and providing operations when a node is restored and added, can be utilized to implement a very stable server, such as a SIP registrar, with a fast response time and a frequent change of information. In consideration of characteristics of a communication system requiring very high stability, the SIP registrar also requires the very high stability and performance. However, since the SIP registrar has a definitely specified implementation method, it has difficulty in satisfying its requirements. However, if the system and the control method according to the embodiment of the present invention are applied to the SIP registrar, a system satisfying such requirements can be constructed. In addition, when a server system is implemented based on a fault tolerant system such as a tandem server, a clustering structure can be utilized at a low cost even when the number of subscribers increases, and it is possible to construct a nonstop service system since servers can be added to the server system even during operation of the server system.

As another example, HLR managing the state of subscribers and terminals in a mobile communication network or the like should have a high update speed and a fast response time and should never stop since it plays a core role in a switching network. Accordingly, when the HLR is implemented by the system and the control method according to one embodiment, a more inexpensive clustering structure can be utilized even when the number of subscribers increases, instead of constructing one expensive server system per five hundred thousand subscribers, and various forms of high availability strategies are possible with no numerical limitation such as one server system per five hundred thousand subscribers. Accordingly, in view of a switcher, when an inquiry is made to the HLR, a complex structure where a different HLR should be found for each subscriber may be changed to a simple structure where an inquiry is made to one group of HLR clusters, which results in an even more simplified structure of a communication network.

Although the preferred embodiment has been shown and described in the drawings and the above description, the present invention is not limited to this embodiment, and may be changed and modified in various ways.

According to the present invention, it is possible to invest in constructing an initial service system based on the amount of service use and it is possible to construct a service system with low costs and high efficiency.

Further, a nonstop service system can be efficiently constructed without requiring additional equipment.

What is claimed is:

1. A system using one or more servers for providing a nonstop service, the system comprising:
 a plurality of node groups coupled to a control dispatch server via a network, and each of the node groups comprising a plurality of nodes, wherein each node group is configured to store and manage data of a user using a user identifier, the data being stored synchronized in time in the respective nodes and being independently managed; and
 a processor of the control dispatcher server to control a status of the plurality of nodes of each node group, the status corresponding to a connection, a load and a response speed of each of the plurality of nodes,
 wherein upon receipt of the user's data retrieval request, the control dispatcher server is configured to
 select one of the plurality of the node groups to provide retrieval request information, the retrieval request information corresponding to the user's data retrieval request, wherein the user's data retrieval request is simultaneously transmitted to the plurality of nodes of the selected node group;
 perform voting to determine most appropriate information from among recently updated information provided by the nodes of the selected node group, wherein the voting is performed based on the plurality of nodes of the selected node group providing the recently updated information to the control dispatcher server; and
 provide most recently updated information to the user, the most recently updated information being the most appropriate information.

2. The system of claim 1, wherein the plurality of nodes are coupled with one another, wherein the plurality of nodes of the selected node group are synchronized.

3. The system of claim 1, wherein the user identifier comprises an identification (ID) corresponding to each user or a telephone number of the user.

4. The system of claim 1, wherein the control dispatcher server is configured to store
 a node identifier to identify a node,
 a node information to identify one of the plurality of node groups,
 a node address comprising an identification (ID) and port information to access the plurality of nodes, and
 node connection information to maintain connection with the plurality of nodes, wherein
 the node information comprises a number of nodes belonging to each of the node groups and data movement among each node, a load balancing, and a response speed of each node.

5. The system of claim 1, wherein the control dispatcher server is configured to remove a non-responsive node from registration in the node groups to provide information corresponding to the user's data retrieval request.

6. The system of claim 5, wherein the control dispatcher server is further configured to restore a previously removed non-responsive node that is determined as a responsive node.

7. A computer implemented method for updating data in a system for providing a nonstop service, the system comprising a plurality of node groups, each node group comprising a plurality of nodes, the method comprising:
- storing and managing user data using a user identifier, the user data being stored in the respective nodes using a non-transitory computer-readable storage medium, the user data being stored synchronized in time in the respective nodes and being independently managed;
- selecting, by a processor of the computer, one of the plurality of node groups upon receipt of a user data update request, the selected node group comprising one or more nodes;
- simultaneously transmitting the request to each node of the selected node group; and
- providing data associated with the request, the data being retrieved from one or more nodes of the selected node group, wherein the selection is determined at the processor by voting for most appropriate data from among data provided by the nodes of the selected node group based on criteria, the criteria comprising most recently updated data and most relevant data, the voting being performed based on the plurality of nodes of the selected node group providing the data associated with the request.

8. The method of claim 7, wherein the system storing and managing data comprises a connection information stored in a computer memory, the connection information corresponding to each connection of the plurality of node groups, and wherein the connection information comprises an indication of a status of removing a non-responsive node corresponding to the user data update request.

9. The method of claim 7, further comprising:
- removing a node from the selected node group if the transmitted user data update request is determined as fault.

10. The method of claim 9, further comprising:
- restoring a node previously removed that is determined as responsive node.

11. The method of claim 9, further comprising:
- adding a new node in response to detection of the faulty node.

12. The method of claim 7, further comprising:
- removing a node from the selected node group if the node is not capable of transmitting a report corresponding to the user data update request.

13. A computer implemented method for retrieving data in a system for providing a nonstop service, the system comprising a plurality of node groups, each node group comprising a plurality of nodes, the method comprising:
- storing and managing state information and connection information of each node group based on an identifier to distinguish user clients, the identifier being stored synchronized in time in the respective node and being independently managed;
- selecting, by a processor of the computer, one of the plurality of node groups upon receipt of a user client for updating request, the selected node group comprising one or more nodes, wherein the selection is performed by voting to determine a most appropriate information from among recently updated information provided by the plurality of nodes of the selected node group, wherein the voting is performed based on the plurality of nodes of the selected node group providing the recently updated information to the processor;
- retrieving most relevant information corresponding to the user client updating request from the selected node group, the user client request being simultaneously transmitted as a broadcasting message to the plurality of nodes of the selected group, the most relevant information being from among the recently updated information; and
- providing, by the processor, the most relevant information to the user client.

14. The method of claim 13, wherein the connection information is stored in a memory, the connection information corresponding to each connection of the plurality of node groups, and wherein the connection information comprises an indication of a status of removing a non-responsive node corresponding to the user client updating request.

15. The method of claim 14, further comprising:
- restoring a previously removed node that is determined as responsive node.

16. The method of claim 13, further comprising:
- removing a node from the selected node group if the user client updating request is not responsive.

17. The method of claim 13, further comprising:
- removing a node from the selected node group if the node is determined not capable of transmitting information corresponding to the user client updating request.

18. A system for providing a nonstop service, wherein
- a plurality of node groups coupled in a network, each node group comprising at least one or more computing nodes and
- each computing node comprising a memory and a processor to store and manage data of a plurality of users, the data stored in each computing node being independently managed and synchronized in time, and the data being identified with a user identifier, the system comprising:
- means for selecting a node group of the plurality of node groups, upon receipt of a user data update request, the selected node group comprising one or more computing nodes, wherein the selection is determined by voting to determine most appropriate information from among recently updated information provided by the computing nodes of the selected node group, wherein the voting is performed based on the plurality of nodes of the selected node group providing the recently updated information, wherein the user data update request is simultaneously transmitted to all computing nodes of the selected node group; and
- means for receiving most relevant data, the most relevant data being among the recently updated information provided by the computing nodes of the selected node group.

19. The system of claim 18, wherein the computing nodes belonging to one of the plurality of node groups does not belong to the other group.

20. The system of claim 18, further comprising:
- means for updating data associated with the data update request user and storing the updated data in the one or more computing nodes of the first node group.

* * * * *